Patented May 5, 1931

1,803,999

UNITED STATES PATENT OFFICE

THOMAS S. CURTIS, OF HUNTINGTON PARK, CALIFORNIA, ASSIGNOR TO THE VITREFRAX COMPANY, OF LOS ANGELES, CALIFORNIA, A CORPORATION

CLAY PRODUCT, CERAMIC COMPOSITION, AND ASSOCIATED PROCESSES

No Drawing.   Application filed June 22, 1926.   Serial No. 117,869.

This invention relates to the art of ceramics, and more particularly to means for enhancing the value of clay products as by addition of strength thereto, as well as other advantageous characteristics not heretofore obtained.

For its primary object my invention aims to provide a composition that may be readily combined with ordinary clays, such as fireclay for instance, and which when added to the plastic mass of clay, pugged to proper consistency, molded, dried and fired, will cause the final clay product to be mechanically reinforced in such a way as to materially, and under certain conditions tremendously, increase the breaking point strength of the product, with almost corresponding increase of tensile and compressive strengths.

Set forth in another way, my invention resides in a ceramic composition adapted to be added to a clay body in the ordinary process of making a clay product, and which by reason of being subjected to such processing, as will be described, will produce in the body a fibrous network of mechanical reinforcement with strength increasing results of remarkable extent, and great importance, from practical and commercial viewpoints.

My invention additionally resides in availing of a crystalline aluminum silicate of fibrous structure as the strength producing medium before referred to.

My invention further includes utilization of an aluminum silicate the fibrous structure of which is derived mainly from kyanite crystals which possess the unique characteristic of growing in length, whilst not materially changing in thickness under the action of predetermined heat control.

My invention also includes powdered aluminum silicate formed of particles of elongated crystals and capable of growing in the direction of their longitudinal axes to a stable condition under high temperature.

My invention still further includes certain other novel features and phases as will hereinafter in part be set forth and in part become apparent and subsequently comprehended in the appended claims.

In order to develop clearly the utility of my invention in the industrial arts, I first note that it is exceedingly important in the production of various clay products to increase the impact strength, or resistance to blows and the tensile and compressive strengths of such products. It is also highly important in such products for many purposes to render said products stable at high temperatures as by decreasing as much as possible the shrinkage action of the bond clay without decreasing its strength. By reducing such shrinkage, the cracking and warpage of the articles produced in the process of manufacture, it may be so greatly decreased as to do away with manufacturing losses resulting from defective final products.

Among the aluminum silicates which may be employed as the strength producing medium before referred to, I note kyanite, fibrous pyrophyllite, fibrous sillimanite, and andalusite. The mineral known as kyanite lends itself particularly to treatment in accordance with the process necessary to provide the improved product by virtue of its tendency to react favorably to the special heat treatment employed in the process.

Without referring to the more complex porcelains and vitreous bodies, it is desirable to explain at this time just how the elements of an ordinary clay product structure are held together. Take simple porous material such as is produced by the molding, drying and firing of fireclay and microscopic examination discloses that the structure derives its strength mainly by reason of the cementing of its individual clay particles, by glasses or siliceous cements which function as a glue to maintain the particles in a compact mass. At ordinary temperature, the cement aforesaid is hard.

Obviously from the foregoing, it will be apparent that the resistance of a clay product ware of the class mentioned to impact, or to tensile, cross-breaking or compressive loads depends entirely upon the strength and the brittleness of the glassy cement which holds the particles of the product together. Moreover, this cementing glass varies widely in its characteristics according to its composition, extent of annealing when the ware is cooling in the kiln, and other things that need not be particularly mentioned.

In practical experience therefore, we come upon two pieces of burnt clay ware substantially identical in appearance but which may have widely different strengths. I have found for instance that terra cotta products separately manufactured in the same clay district may in one instance have a difference in break factors of as much as 980 to 186. The manufacturers, moreover, may be competing in the same market. The difference in the break factor is due to the fact that the glass of one clay product has a much greater physical strength than that of the other.

With the foregoing observations, and as a result of prolonged studies that have lead up to the present invention, I have concluded that the proposition of increasing the strength of burnt clay ware requires a strengthening in some way or other of the glassy cement which glues the particles of the product together. By this invention I have produced a fibrous reinforcement in the clay body for obtaining a structure interwoven much as are the fibres in paper.

My composition for mechanically reinforcing or strengthening clay products consists of kyanite, a mineral of the silliminate group of aluminum silicates.

Kyanite possesses a fibrous structure as it occurs in nature. By heating the kyanite to a temperature and for a sufficient length of time to cause ceramic cone 4 to be brought down, the typical kyanite crystals undergo a change which is unique in the minerals class. In other words the fibres grow considerably in length but they do not change materially in their thickness. The same phenomenon as to growth of the fibres appears at temperatures above cone 4 with increasing effects and usually complete stability is reached at about cone 18 at which temperature the lengths of the fibres stop growing, and between this temperature and cone 36, no appreciable change in length takes place. Above cone 36, melting ensues at which time the fibres will lose their identity. The characteristic elongating growth of fibres of kyanite is peculiarly availed of by my invention and as kyanite is a mineral obtainable in large quantities, it is highly desirable to utilize the same for the purpose of strengthening clay products and otherwise predetermining the production of such products in a manner to do away with wastage and losses incident to defective manufacture.

Kyanite ore if reduced to a powder will be broken into angular fabrics rather than fibres, so pulverization is therefore not resorted to. According to my invention, I heat the kyanite ore to a temperature approximating between 1700 degrees F. to 1800 degrees F., largely dependent upon the character of the ore as mined. This temperature should be sufficient to drive off the usual small traces of crystalline water, and to only start the elongation phenomenon previously referred to as creating the fibrous growth of which I desire to avail. Additionally, this temperature will change the structure of the quartz gangue associated with the kyanite ore to fracture the quartz away from the kyanite readily. In this way, I break down the kyanite fibres into individual slender shafts. Then by table concentration with water, the fibres may be brought to practically any desired composition or ratio of quartz and other ingredients such as pyrophyllite and possibly other minerals included with the said kyanite. By additional milling of the kyanite fibres, they will be merely broken apart but their structure will be unchanged materially. By the above steps of my process of making my composition the production of rounded pieces or particles of kyanite is absolutely minimized.

In carrying forward my process, I maintain a reducing temperature during the roasting operation above referred to and in this way, I am enabled not only to accelerate the change in structure to produce the fibres but I obtain an additional result, i. e., render the iron oxide bearing components of the ore magnetic so that they may be readily separated from the rest of the product by employing standard type magnetic concentrators. The removal of the iron oxide bearing components of the ore to a greater or less extent controls its purity and color, and since these factors are of importance to the ultimate clay product with which my composition may be combined, the said control is highly desirable from the standpoint of practical manufacture.

In lieu of employing the table concentration method of controlling the desired ultimate composition of my product as respects the ratio of kyanite fibres to quartz and other substances, I may use a totally different method or process of separating the fibres to a greater or less extent from the attached minerals referred to. The alternative process to which I now refer consists in subjecting the crude kyanite ore to a very sudden change in temperature by plunging the red hot charge of the same as it comes from the converter into cold water. In this way, the kyanite crystals are not shattered by the quenching of the rock, but the surrounding quartz gangue is converted into a soft granular material that renders the rock so friable that it may be broken apart by pressure of the fingers. By this quenching process, the kyanite crystals may be readily cleared of the attached particles of quartz, etc., in a very thorough and effective manner, and the subsequent concentration of the material may be readily performed. After the quenching of the crude ore as described, it is only necessary to crush the material as by the use of a swing hammer or any suitable impact type of mill, and then by screening the crushed product as much of the gangue or quartz may be removed as may be desired, by only the screening operation. The relative pure kyanite fibres will remain on the screen and the quartz or gangue will pass through as a sand, having somewhat the characteristics of granulated sugar. This method of separation of the kyanite fibres from the gangue or quartz or other associated unneeded minerals is to be preferred to that first described, as it reduces the cost of the processing operation, and avoids the necessity of resorting to table concentration with water.

Having in view the desirability of increasing the strength of burnt clay products, by interweaving within the mass of glass cemented particles of the product, insoluble, inert and strong fibres which will reinforce the glassy cement, the action of my composition when added to the clay product will accomplish the object above outlined.

The plastic mass of clay should have the strengthening composition of this invention added in predetermined useful proportions with respect to that of the mass. The clay mass includes particles of relatively pure clay substance of a colloidal nature including many impurities such as fine sand, mica, iron pyrites, rock of uncertain composition, clay which is relatively pure but often not sufficiently fine to be plastic, and to this mass of clay my strengthening composition will be added. The said composition is in the form of a powder consisting of the slender fibrous crystals of kyanite plus associated adulterants which will function in a manner hereinafter to be set forth.

When my strengthening composition, and the clay are moistened, pugged to proper consistency, molded, dried, and fired, peculiar changes in the structure of the combined mass takes place. As the temperature increases in the firing, the free remaining water or moisture is of course expelled. Later, the chemical or combined water passes off at higher temperature. At this stage plasticity is destroyed and the mixture is then no longer clay because its colloids have been changed with the loss of its clay-like properties. Further increase of temperature, causes contained organic matter, such as decayed vegetation to oxidize and leave pore spaces. Necessarily if something to counteract such change were not present, fire shrinkage would immediately ensue. My strengthening composition, it will be recalled, however, includes the slender shafts or fibres, and these start to grow in length as the oxidation of the organic substances carried by the clay takes place, and at the same time the temperature increases so that the various admixed impurities start to soften and form the various glass or cementing compositions that have been previously referred to.

By reason of the provision of the growing fibres of my strengthening composition, the fire shrinkage which would ordinarily ensue as the cementing glasses form and the clay particles begin to coalesce, does not take place as would be the case where the fibres do not elongate as described, the elongating or growing holding apart the clay particles but causing the glass to surround the same and the fibres themselves, with a matrix or cement. The foregoing phenomenon is maintained up to the point of full maturity of the given clay body. It must be apparent moreover, that by simple proper proportioning of my strengthening composition with the mass of clay used, I am enabled to effect a complete equilibrium such that there is neither expansion, nor shrinkage caused in the firing of the product.

The final fired clay body, including my strengthening composition will thus comprise a mass of clay particles interspersed with the strengthening fibres or reinforcing slender shafts growing in the voids left by the exit of water and organic matter, the said fibres and the clay particles cemented together in the interstices with the glass that ordinarily forms the only bond between said particles.

With my invention in practise, the characteristic of brittleness from a correctly proportioned and fired clay product containing my strengthening composition is totally avoided, first by doing away with the strains due to shrinkage and firing; second, by the interspersion of the long tough reinforcing fibres throughout the mass; and third, by causing the glassy cement to function as a mere pore filler for holding together the fibrous reinforcement. In substitution for the ordinary brittle glassy cement in the ordinary clay product I obtain a cement which is reinforced with a mass of interwoven fibres and the physical structure of the usual or common burnt clay body is completely changed.

I have found that the extent to which my strengthening composition should be employed for best commercial results varies for different kinds of clay products. It is usually necessary to determine by study the facts of the strengthening composition with a particular composition of clay product body. Such clay products may roughly be classified as follows:

1. Products too low to bring about the characteristic elongation of kyanite fibres in the maturing temperatures, and therefore not advantaged by the use of my composition, such as red brick, paving brick, flower pots, etc.

2. Products maturing at temperatures from cone 4 to cone 12 and embracing all large tonnage types exclusive of the first mentioned above.

3. Products maturing from temperatures from cone 12 to cone 18 in which may be included fine porcelains, refractory wares, heavy duty saggers, etc.

My strengthening composition as composed and processed in the manner herein described is especially useful for products of the second class above referred to. The kyanite crystals bear a definite relation to the other ingredients of the finished product. The function of the adultering ingredients is to hold down the refractoriness of the product to an extent that the addition of my composition the standard bodies maturing at temperature minimums of cone 4 and maximums of cone 12 will not be rendered so refractory that an actual loss of strength is caused instead of gained. I have found that the addition of pure kyanite powder to a terra cotta body maturing at cone 6 will reduce the strength to a marked degree, whereas the addition of 20% of my specially prepared kyanite composition, even though it be of inferior purity, strengthens certain terra cotta bodies as much as 2200%.

My strengthening composition as prepared for the market may be of a formula according to the following notation, though I do not wish to be limited, of course, to the exact propositions specified, as they are merely typical of the strengthening product that gives the greatest value as to strengthening effect, in typical terra cotta, stone ware, sagger, low-fire refractory ware, and similar bodies fired to cone 4 on the low side, and cone 12 on the high side.

|  | Per cent |
|---|---|
| Crystals of pure kyanite | 68 |
| Crystals of tourmaline | 11 |
| Kyanite crystals imbedded in quartz | 7 |
| Free quartz fragments | 4 |
| Crystals of pyrophyllite and associated impurities | 10 |

Subject matter disclosed, but not claimed herein, is claimed in my divisional copending applications.

Having thus described my invention, what I claim as new and desire to secure by Letters Patent of the United States, is:—

1. A ceramic clay strengthening composition, comprising 1, crystals of pure kyanite; 2, crystals of pure tourmaline; 3, kyanite embedded in quartz; 4, free quartz, said kyanite crystals having been heat treated by heat ranging approximately 1700° to 1800° F.

2. A ceramic composition for strengthening clay products which comprises a mineral product of fibrous crystalline structure obtained by heat treating a fibrous aluminum silicate mineral to a temperature of from approximately 1700° F. to approximately 1800° F.

3. A ceramic composition for strengthening clay products which comprises a mineral product of fibrous crystalline structure obtained by heat treating kyanite to a temperature of approximately 1700° F. to approximately 1800° F.

4. A ceramic composition for strengthening clay products which comprises a mineral product of fibrous crystalline structure obtained by heat treating a fibrous aluminum silicate mineral to a temperature sufficient to change the structure of associated quartz gangue to fracture it away readily from the mineral product, but not exceeding approximately 1800° F., and then quenching the heat treated material.

5. A ceramic composition for strengthening clay products which comprises a mineral product of fibrous crystalline structure obtained by heat treating kyanite to a temperature sufficient to change the structure of associated quartz gangue to fracture it away readily from the mineral product, but not exceeding approximately 1800° F., and then quenching the heat treated material.

6. A method of producing a ceramic composition for strengthening clay products which comprises heat treating under reducing conditions a fibrous aluminum silicate mineral to a temperature sufficient to change the structure of associated quartz gangue to fracture it away from the mineral but not exceeding approximately 1800° F., and immediately quenching the heat treated material.

7. A method of producing a ceramic composition for strengthening clay products which comprises heat treating under reducing conditions kyanite to a temperature sufficient to change the structure of associated quartz gangue to readily fracture it but not exceeding approximately 1800° F., and immediately quenching the heat treated material.

8. A ceramic composition for strengthening clay products which comprises a mineral product of fibrous crystalline structure obtained by heat treating kyanite to a temperature sufficient to change the structure of associated quartz gangue to fracture it away readily from the mineral product, but not exceeding approximately 1800° F., and then concentrating the heat treated material.

9. A ceramic composition for strengthening clay products which comprises a mineral product of fibrous crystalline structure obtained by heat treating a fibrous aluminum silicate mineral to a temperature sufficient to change the structure of associated quartz gangue to fracture it away readily from the mineral product, but not exceeding approximately 1800° F., and then concentrating the heat treated material.

10. A method of producing a ceramic composition for strengthening clay products which comprises heat treating a fibrous aluminum silicate mineral to a temperature of from approximately 1700° F. to approximately 1800° F.

11. A method of producing a ceramic composition for strengthening clay products which comprises heat treating kyanite to a temperature of from approximately 1700° F. to approximately 1800° F.

12. A method of producing a ceramic composition for strengthening clay products which comprises heat treating under reducing conditions a fibrous aluminum silicate mineral to a temperature of from approximately 1700° F. to approximately 1800° F. and immediately quenching the heated material.

13. A method of producing a ceramic composition for strengthening clay products which comprises heat treating under reducing conditions kyanite to a temperature of from approximately 1700° F. to approximately 1800° F. and immediately quenching the heated material.

14. A method of producing a ceramic composition for strengthening clay products which comprises heat treating under reducing conditions a fibrous aluminum silicate mineral to a temperature of from approximately 1700° F. to approximately 1800° F. and concentrating the heated material.

15. A method of producing a ceramic composition for strengthening clay products which comprises heat treating under reducing conditions kyanite to a temperature of from approximately 1700° F. to approximately 1800° F., and concentrating the heated material.

16. A ceramic composition comprising clay containing a mineral product of fibrous crystalline structure obtained by heat treating a fibrous aluminum silicate mineral to a temperature of from approximately 1700° F. to approximately 1800° F.

17. A ceramic composition comprising clay containing a mineral product of fibrous crystalline structure obtained by heat treating kyanite to a temperature of from approximately 1700° F. to approximately 1800° F.

18. A ceramic composition comprising clay containing a mineral product of fibrous crystalline structure obtained by heat treating a fibrous aluminum silicate mineral to a temperature sufficient to change the structure of associated quartz gangue to fracture it away readily from the mineral product, but not exceeding approximately 1800° F., and then quenching the heat treated material.

19. A ceramic composition comprising clay containing a mineral product of fibrous crystalline structure obtained by heat treating kyanite to a temperature sufficient to change the structure of associated quartz gangue to fracture it away readily from the mineral product, but not exceeding approximately 1800° F., and then quenching the heat treated material.

In testimony whereof I affix my signature.

THOMAS S. CURTIS.